(12) United States Patent
Crawford et al.

(10) Patent No.: US 7,832,173 B2
(45) Date of Patent: *Nov. 16, 2010

(54) SCREW FASTENER IN MULTIPLE FLOOR TRUSS AND WOOD-TO-WOOD SHEAR CONNECTION

(75) Inventors: Mark G. Crawford, Visalia, CA (US); Steven E. Pryor, Dublin, CA (US); Alfred D. Commins, Friday Harbor, WA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 923 days.

This patent is subject to a terminal disclaimer.

(21) Appl. No.: 09/728,187

(22) Filed: Dec. 1, 2000

(65) Prior Publication Data

US 2001/0009638 A1      Jul. 26, 2001

Related U.S. Application Data

(63) Continuation-in-part of application No. 09/487,981, filed on Jan. 20, 2000, and a continuation-in-part of application No. 09/692,674, filed on Oct. 18, 2000, now abandoned, which is a continuation of application No. 08/920,417, filed on Aug. 29, 1997, now Pat. No. 6,109,850, which is a continuation of application No. 08/725,003, filed on Oct. 1, 1996, now abandoned.

(51) Int. Cl.
    *E04C 3/02* (2006.01)
(52) U.S. Cl. ............................. 52/690; 52/639; 411/424
(58) Field of Classification Search .................. 52/691, 52/639, 696; 411/411, 424, 387.1, 387.2
See application file for complete search history.

(56) References Cited

U.S. PATENT DOCUMENTS

| 3,941 | A | * | 3/1845 | Pierce .......................... 125/42 |
| 57,966 | A | | 9/1866 | Prosser |
| RE3,941 | E | | 4/1870 | Pierce |
| 470,804 | A | | 3/1892 | Jones |
| 471,179 | A | | 3/1892 | Jones |

(Continued)

FOREIGN PATENT DOCUMENTS

DE      100 51 793 A1      5/2001

(Continued)

OTHER PUBLICATIONS

Simpson Strong-Tie Company, Inc. catalog C-2001—Effective Jan. 1, 2001, p. 105 L-70 Reinforcing Angle.

(Continued)

*Primary Examiner*—Basil Katcheves
(74) *Attorney, Agent, or Firm*—James R. Cypher; Charles R. Cypher (57) ABSTRACT

Screw fasteners are used to connect multiple trusses in side-by-side relationship. The screw fasteners join truss wood members which are in edge to edge relationship with the screws being driven through the edge of each wood member. The screws may be knurled screws as described in U.S. Pat. No. 6,109,850; lag screws, or standard screws. The connection may also join wood board members in edge-to-edge relationship when bending of the wood members is limited by a restraining structure.

34 Claims, 7 Drawing Sheets

U.S. PATENT DOCUMENTS

| | | | |
|---|---|---|---|
| D31,749 S | | 10/1899 | North |
| 1,542,919 A | | 6/1925 | Summerbell |
| 1,723,500 A | | 8/1929 | Campbell |
| 1,905,616 A | | 4/1933 | Zanella |
| 2,019,049 A | | 10/1935 | Hoke |
| 2,020,815 A | | 11/1935 | Venzie |
| 2,024,069 A | | 12/1935 | Sharp |
| 2,139,363 A | | 12/1938 | Graham et al. |
| 2,764,108 A | | 9/1956 | Findleton |
| 2,768,434 A | | 10/1956 | Taylor |
| 2,770,846 A | | 11/1956 | Findleton |
| 2,871,752 A | | 2/1959 | Stern |
| 2,911,690 A | * | 11/1959 | Carol ..................... 403/232.1 |
| 3,039,152 A | | 6/1962 | Hillesheim |
| 3,330,087 A | | 7/1967 | Troutner |
| 3,346,999 A | | 10/1967 | Johnson |
| 3,357,148 A | | 12/1967 | Turner |
| 3,478,639 A | | 11/1969 | Gruca |
| 4,441,287 A | | 4/1984 | Muir |
| 4,454,694 A | * | 6/1984 | Davanture ..................... 52/270 |
| 4,580,780 A | * | 4/1986 | Gautraud et al. ............ 473/115 |
| 4,665,672 A | | 5/1987 | Commins et al. |
| 4,834,602 A | * | 5/1989 | Takasaki ..................... 411/386 |
| 4,965,973 A | | 10/1990 | Engebretsen |
| 5,048,256 A | | 9/1991 | Thorsnes |
| 5,150,553 A | | 9/1992 | Commins et al. |
| 5,201,627 A | * | 4/1993 | Biedenbach ................ 411/531 |
| 5,295,774 A | | 3/1994 | Roberts |
| 5,516,248 A | * | 5/1996 | DeHaitre ................. 411/387.2 |
| 5,653,079 A | | 8/1997 | Loeffler et al. |
| 5,680,735 A | * | 10/1997 | Bates ........................ 52/591.5 |
| 6,109,850 A | * | 8/2000 | Commins ................ 411/387.2 |

FOREIGN PATENT DOCUMENTS

| | | |
|---|---|---|
| EP | 0 937 832 A2 | 8/1999 |
| FR | 897908 | 4/1945 |
| FR | 897908 | 4/1946 |
| GB | 840759 | 7/1960 |
| JP | 2-278005 A | 11/1990 |
| JP | 2278005 | 11/1990 |

OTHER PUBLICATIONS

Merk GmbH, "SFS WT-System Von Merk," Merk, Merk GmbH (Germany), consisting of 2 pages and 2 pages of English translations, (at least as early as Oct. 22, 2002).
Quadriga, "Praxisorientierte Diplomarbeiten," Quadriga Die Hochschulseite, Quadriga, (Germany), numbered p. 66 and 1 page of English translation, (Jan. 1997).
Beuth Verlag GmbH, "Structural Use of Timber," Deutsche Norm, Beuth Verlag GmbH (Germany), numbered pp. 1-27, (Apr. 1988).
Willamette Industries Inc., "Struclam LVL," Willamente Industries, Inc., (U.S.A.), consist of 5 pages, (1999).
USP Kant-Sag Silver Lumbar Connectors, "FTC1, FTC2 Floor Truss Clip," USP Kant-Sag Silver Lumbar Connectors, (U.S.A.), consist of 1 page, (at least as early as Feb. 19, 1998).
Alpine Construction Hardware, "Load Share Clip," www.alpeng. com, Alpine Construction Hardware, (U.S.A.), p. 49, consist of 1 page, (at least as early as Aug. 13, 1997).
Cleveland, "Load Share Clip," The One That Really Works, Cleveland, (U.S.A.), consist of 1 page, (at least as early as Feb. 27, 1998).
Lionel S. Marks, "Mechanical Engineers' Handbook," McGraw-Hill Book Company, Inc., (U.S.A.), p. 879 and 880, consist of 2 pages, printed both sides, (1951).
Simpson Strong-Tie Company , Inc., "Wood Construction Connectors," Catalog No. C-96, Simpson Strong-Tie Company, Inc. (U.S.A. ), p. 14 and 15 consist of 2 pages, (1996).
Donald E. Breyer, "Chapter 11 Wood Connections—Background, Chapter 13—Bolts, Lag Bolts, and Other Connectors," Design of Wood Structures, 3rd ed., McGraw Hill (USA), p. 533-559 and 623-701, consist of 29 pages (1993).
Lawrence A. Soltis, "Chapter 3—Lag Screws and Wood Screws, Chapter 6—Timber Connector," Mechanical Connections in Wood Structures, American Society of Civil Engineers (USA), p. 91-125 and 173-220, consist of 23 pages (1996).
Bulldog-Simpson, "Crampons Bulldog," Crampons Bulldog, Bulldog-Simpson (Germany), p. 1-8, consist of 4 pages, (at least as early as Apr. 29, 1999).
Timberlok, "So Long, Lags!," Journal of Light Construction, Journal of Light Construction (USA), p. 36-37, consist of 1 page (Jun. 2000).
Willamette Industries, Inc., "Fastening Recommendations for Side-Loaded, Multiple-Piece Members," Willamete Industries, Inc., (U.S. A.), consist of 2 pages, (Nov. 11, 1999).
U.S. Appl. No. 09/692,674, Continuation in Part, Screw Fastener in Multi-Ply Wood Structure Shear Connection, Specification, Claims, Abstract and Drawins (26pgs).
Declaration of William Georges with attached Exhibit A executed on Aug. 5, 2004 (7 pgs).
Bulldog-Simpson GmbH, Crampons Bulldog, 8 pages, 1999, Skye, Germany.
Din Deutshes Institut fur Normung e. V., Structural Use of Timber, Mechanically fastened joints, DIN 1052, Apr. 1988, 27 pages, Berlin, Germany.

\* cited by examiner

SCREW FASTENER IN MULTIPLE FLOOR TRUSS AND WOOD-TO-WOOD SHEAR CONNECTION

This application is a continuation-in-part both of prior application Ser. No. 09/487,981, filed Jan. 20, 2000, since abandoned, and of prior application Ser. No. 09/692,674, filed Oct. 18, 2000, since abandoned. Prior application Ser. No. 09/692,674 is a continuation-in-part of prior application Ser. No. 09/487,981, filed Jan. 20, 2000 and since abandoned. Prior application Ser. No. 09/487,981 is a continuation of prior application Ser. No. 08/920,417, filed Aug. 29, 1997 and issued as U.S. Pat. No. 6,109,850 on Aug. 29, 2000. Prior application Ser. No. 08/920,417 is a continuation of prior application Ser. No. 08/725,003, filed Oct. 1, 1996 and since abandoned.

BACKGROUND OF THE INVENTION

In regions of the country subject to earthquake and hurricane events, it is becoming increasingly common to provide metal straps and anchors for affixing wood frame structures to their concrete foundations. For many years manufacturers such as Simpson Strong-Tie Company, Inc. have designed holdowns for use with bolts. (see Simpson catalog, Jan. 1, 1996 pages 14 and 15 which illustrates holdowns such as HD2A covered by U.S. Pat. No. 4,665,672). These holdowns are very effective, but their load rating is affected by the material which must be drilled out of the wood studs in order to receive the stud bolts which range in diameter from 5/8" up to 1". Moreover, some undesirable looseness is inherent in the connection by contractors who may inadvertently overdrill the bolt holes, or simply by the fact that wood shrinkage occurs after installation of the bolts.

The use of nails instead of bolts in holdowns has greatly reduced the shrinkage and looseness problem of bolts and has led to the development of strap holdowns as illustrated on pages 20, 22, and 23 e.g. of the Simpson catalog supra, (see e.g. U.S. Pat. No. 5,150,553.) The problem with holdowns which use nails is the fact that they must be very long to accommodate the many nails that are required. See e.g. Simpson catalog page 23 in which the HPAHD22-2p requires 23-16d nails and may be 22" to 42" in length. Many contractors now use nailing guns to drive the nails, but for the person who does not have a nailing gun, the prospect of driving 23 nails for each strap holdown means the expenditure of a great deal of energy driving the nails.

With the increasing use of powered drills, the feasibility of using wood screws as fasteners instead of nails and bolts is now a reality. The problem with screws, particularly for large loading in shear is that standard screws have several weaknesses. First, it was found that the heavy duty power drivers snapped the heads off a high percentage of standard screws before the clutch disengaged the drive at the end of the driving cycle when the head abruptly reached the immovable sheet metal connector plate. Second, those screws which had adequate unthreaded shank portions to resist the large shear loads, split the wood upon installation or shortly thereafter because the diameters of the unthreaded portions were larger than the bore made by the threaded portion of the screw. Third, adequate self drilling features were difficult to find in large size wood screws. Finally, existing screw fasteners with unthreaded portions adjacent the head which had smaller diameters to prevent wood splitting, were too loose. Looseness in standard screw fasteners between the unthreaded shank and the side of the bore hole which are subject only to pull out, is not a problem. Looseness, between the unthreaded shank portion and the side of the bore hole is a major problem when the screw fastener is subject to shear loads; particularly when the shear loads are cycling loads as they are in earthquakes and hurricanes. In such situations, each reversal of the shear loading tends to widen the bore opening until major loosening occurs and now the loads are impact loads which endanger the structure due to wood splitting.

Floor Trusses

In the floor truss industry, occasions arise when either the uniform load or a concentrated load exceeds the capacity of a single truss. This requires use of a double truss by placing two side-by-side and connecting them so that a portion of the excess load can be transferred from one truss to the other. One such example is described in Loeffler, U.S. Pat. No. 5,653,079 wherein a sheet metal bracket is described which is attached to the wood portions of the truss by screw or nail fasteners. It has been found by tests that load transfer from one truss to the other is diminished due to the inherent looseness of the bracket connection permitting slip between the trusses as load is applied.

Further, such brackets are relatively expensive, time consuming and difficult to install. Most brackets must be installed before the trusses are "in place".

Because the prior brackets have an inherent looseness and because the loads carried by the two trusses are different, the trusses tend to deflect measurably different distances.

Finally, because prior art sheet metal brackets require several inches of truss surface area for installation, it is not always convenient or desirable to use such brackets.

Another way to join wood trusses is by preboring and bolting. The problem with boring openings is the loss of wood cross section and the inability to obtain and maintain a close fit between the bore walls and the bolts.

SUMMARY OF THE INVENTION

This application describes a wood screw which solves the aforesaid problems. First, a higher strength steel was used in the wood screw of the present invention.

Second, the wood screw of the present invention is formed with a cutting means at the entering end so that bore holes need not be predrilled.

Finally, the major problem of looseness between the sides of the fastener and the bore hole has been solved by the use of a knurled section which functions in a unique manner described herein below.

The use of the wood screw of the present invention solves the problems introduced by bolts by eliminating the need to predrill large openings in the wood which weaken the wood member in tension as introduced by earthquake and hurricane loadings.

The use of the wood screw of the present invention solves the problem introduced by nails by enabling the strap connection to the wood frame to be significantly reduced in length thus saving in metal costs and installation problems.

The wood screw of the present invention is primarily for connecting wood structural members to sheet metal connectors in shear, but may also be used with heavy metal members or even wood to wood connections.

Floor Trusses

This application is specifically directed to the use of the special knurled screws of the present invention in joining the top and bottom wood chords and other truss members in multi-ply wood floor trusses. Such a connection obviates the problems formerly experienced in joining multi-ply wood trusses by boring bolt openings and inserting bolts, or connecting the trusses with metal brackets.

Such a procedure also obviates the problems of using sheet metal connectors which are expensive to make and even more expensive to install. Multi-ply trusses joined by screws of the present invention, far out perform multi-ply trusses joined by sheet metal connectors in sharing uniform loads or fixed loads and especially through events such as earthquakes and hurricanes where there is a cyclical loading of the truss which tends to loosen prior art sheet metal bracket connections.

An advantage of the present invention is that screws can connect the trusses before or after the trusses are "in place".

A further advantage is that the trusses can be connected using standard construction equipment.

A still further advantage is ease with which the screws can be installed. A standard power drill can install a few screws much more quickly than having to pound several nails at different angles to connect a sheet metal bracket requiring 10 or more nails or short screws. Because of the different angles or space limitations, it is not always possible to install all of the nails or screws in the sheet metal bracket with power tools.

The most significant advantage of the present invention over the prior art is the fact that the load transfer rate is significantly greater than with prior art sheet metal connectors.

As a direct result of the greatly improved load transfer rate, and because the screw connection of the present invention avoids most of the looseness of the prior art sheet metal brackets, the differential deflection performance is greatly improved.

The logistics of transporting, storing, and installing screws is a great deal easier than carrying around and storing bulky boxes of sheet metal brackets as opposed to a bag or boxful of screws.

Finally, the present screw connection can be used to install, top chords only, bottom chords only, webs only or vertical members only which is not always possible with prior art sheet metal brackets.

BRIEF DESCRIPTION OF THE DRAWINGS

FIG. 9 is a cross section of an enlarged portion of the truss chords and web portions of the two side-by-side trusses illustrated in FIG. 7 taken along line 8-8 of FIG. 7. FIG. 9 illustrates a first bore formed in the chords of the side-by-side floor trusses illustrated in FIG. 7 taken along line 8-8 of FIG. 7. In this example, the first bore is the first step in the installation of standard lag screws as illustrated in FIG. 11.

FIG. 10 is a cross section of an enlarged portion of the truss chords and web portions of the two side-by-side trusses illustrated in FIG. 7 taken along line 8-8 of FIG. 7. FIG. 10 illustrates a second bore formed in the chords of the side-by-side floor trusses illustrated in FIG. 7 taken along line 8-8 of FIG. 7. In this example, the second bore is the second step in the installation of standard lag screws as illustrated in FIG. 11.

FIG. 11 is a cross section of an enlarged portion of the truss chords and web portions of the two side-by-side trusses illustrated in FIG. 7 taken along line 8-8 of FIG. 7. FIG. 11 illustrates a standard lag screw installed in the first and second bores illustrated in FIGS. 9 and 10.

DESCRIPTION OF THE INVENTION

Figures 1, 4:
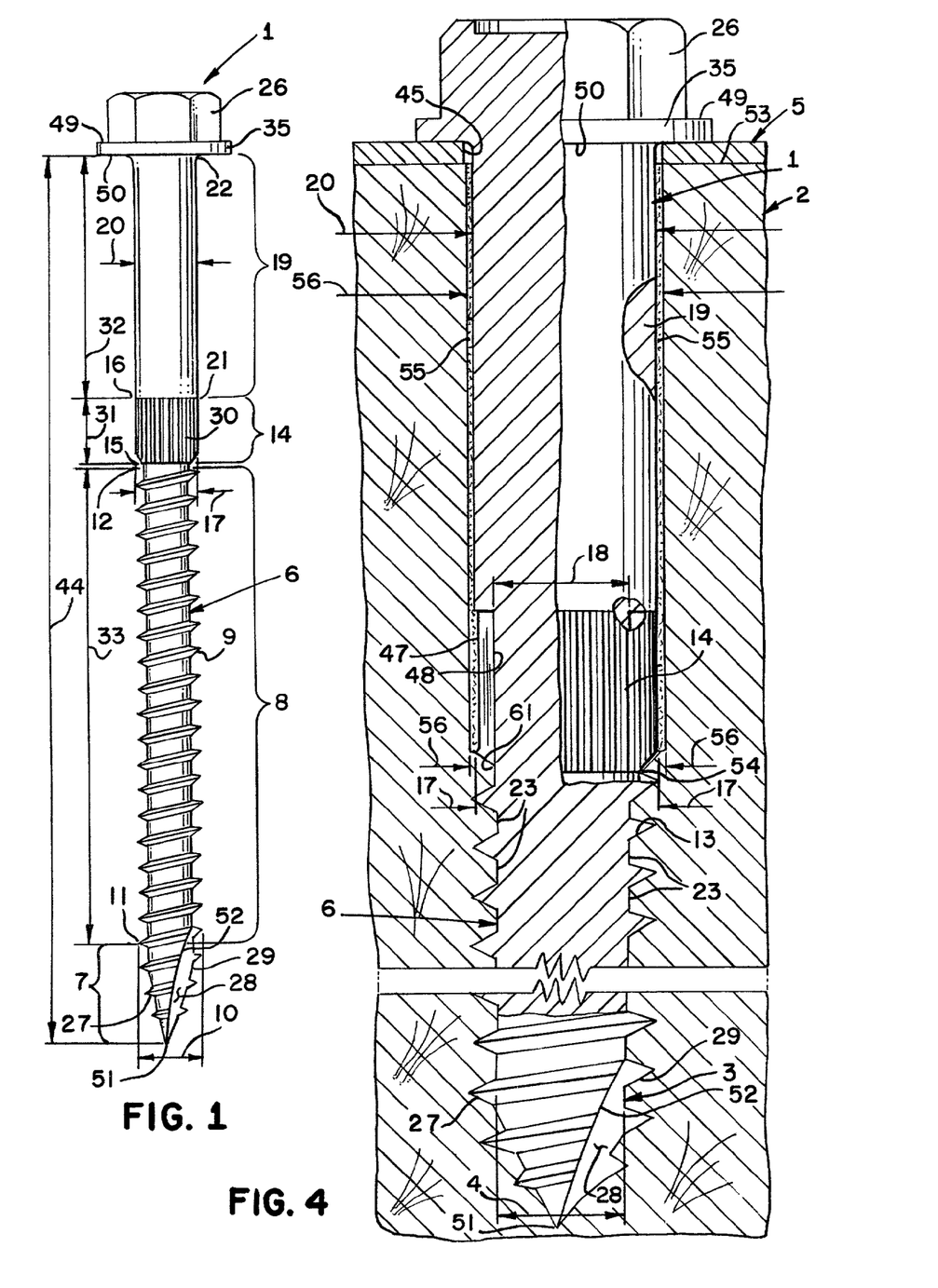
FIG. 1 is a side elevation view of a wood screw which is representative of one embodiment of the present invention.
FIG. 4 is a partial central sectional view of the wood screw shown in FIGS. 1, 2 and 3 in which the wood screw is fully installed.
Figures 5, 6:
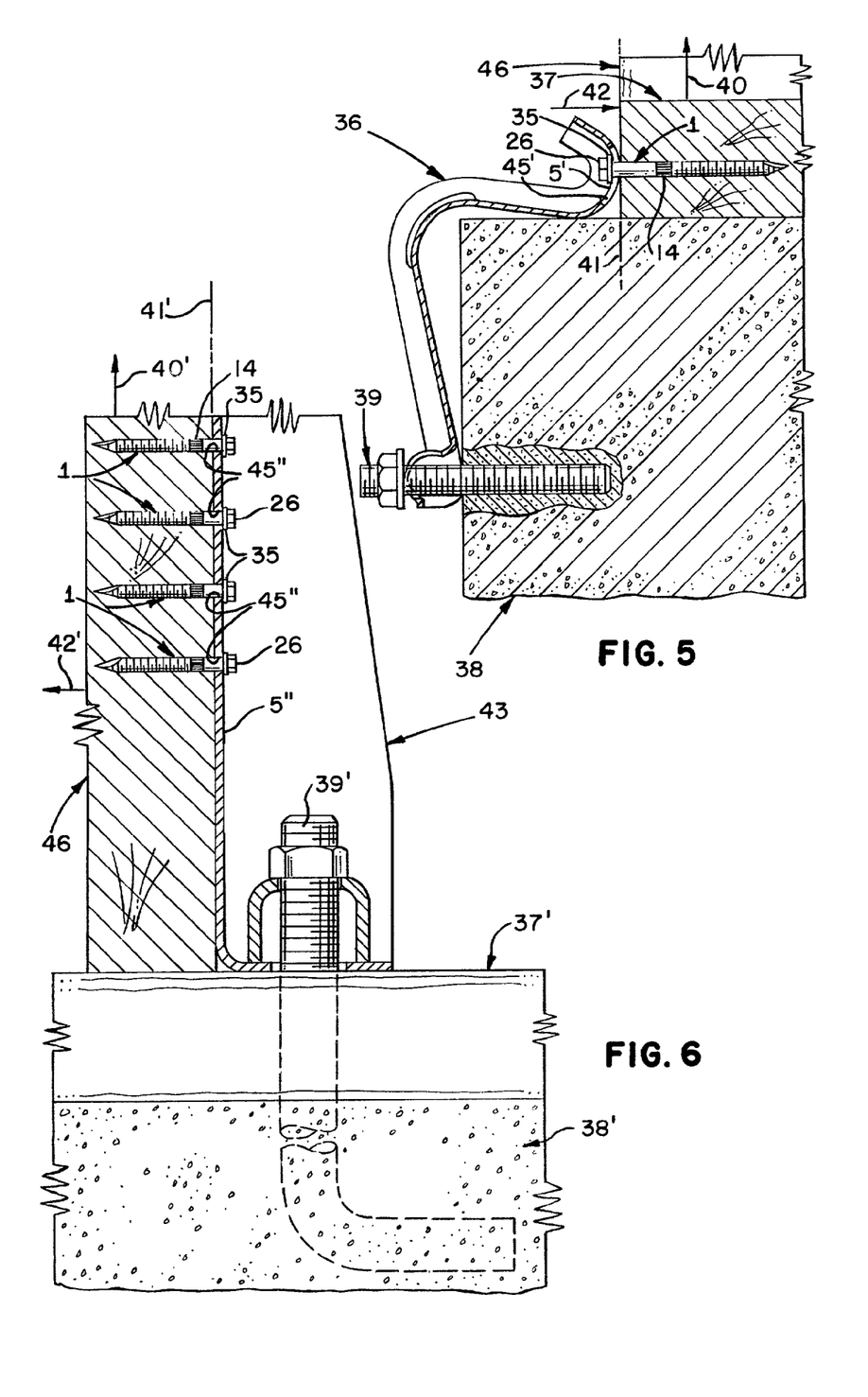
FIG. 5 is a side cross sectional view of the screw shown in FIG. 1 installed in a typical installation. A foundation to frame sheet metal connector is illustrated connecting a wood frame member to a concrete foundation.
FIG. 6 is a cross sectional view of another use of the wood screws of the present invention.

Referring to the drawings, and in particular FIGS. 1 and 6, the wood screw 1 of the present invention is adapted to hold a wood structural member 2 formed with a first bore 3 to a sheet metal member 5 or a first wood member 101 to a second wood member 102 in shear.

While the wood screw 1 of the present invention has excellent pull out value, the design is primarily directed to resisting shear forces. Three examples of environments in which the wood screw of the present invention is subject to shear forces are illustrated in the drawings.

Referring to FIG. 5, wood screw 1 connects a retrofit hold-own device 36 to a wood sill member 37 resting on concrete foundation 38. Wood screw 1 is inserted through opening 45' in sheet metal member 5'. A bolt 39 connects the retrofit holdown device 36 to foundation 38. Arrow 40 represents an upward force exerted on wood sill member 37 which may occur during either an earthquake or a high wind force such as a hurricane. Such an upward force as represented by arrow 40 exerts a shear force along shear plane 41 as shown in FIG. 5. As may be understood, a force acting in the direction of arrow 42 exerts a pull out force on wood screw 1.

Another example of shear forces exerted on wood screws 1 of the present invention is illustrated in FIG. 6. Here, a sheet metal holdown 43 is connected to a foundation 38' by anchor bolt 39' and securely holds wood sill member 37' to foundation 38'. Wood screws 1 of the present invention are inserted through openings 45" in sheet metal member 5" of holdown 43 into wood stud member 46. Arrow 40' represents an upward force imposed by an earthquake or high winds such as a hurricane which imposes a shear load along shear plane 41'. Arrow 42' represents a horizontal load imposed by an earthquake or high winds such as a hurricane which imposes a pullout force on wood screws 1.

Figures 2, 3:
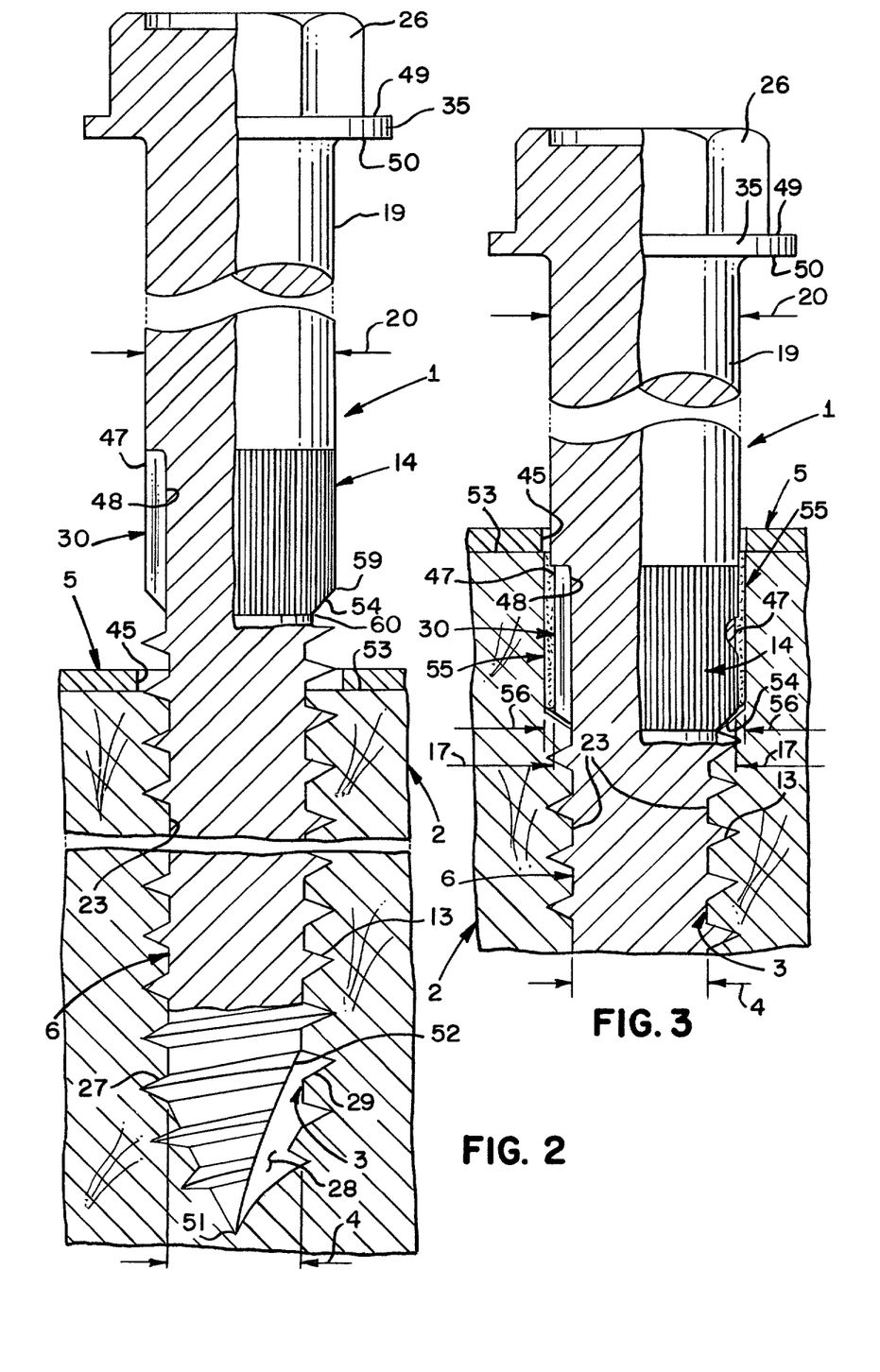
FIG. 2 is an enlarged scale, partial central sectional view of the fastener shown in FIG. 1 in operative association with a portion of a wood structural member and a portion of a sheet metal member. Portions of the wood screw have been cut to indicate portions of the axial length of the wood screw have been removed so that the wood screw may meet the drawing paper restrictions. The upper portion of the wood screw is only partially in cross section to clarify the details of the invention. In this view, the pointed end portion 7 and substantially all of the threaded shank portion 8 has moved through the opening in the sheet metal member 5 and entered the wood structural member 2. The knurled section 14 has not yet entered the bore opening 3.
FIG. 3 is a partial central sectional view of the wood screw shown in FIGS. 1 and 2 in which the knurled portion 14 has just passed through the opening in the sheet metal member 5 and has entered the wood structural member 2. A portion of the knurled means 14 has been removed to show how the portions between the knurls fill up with mashed wood fibers from the wood structural member.

Referring now in detail to the wood screw 1 of the present invention as most clearly shown in FIGS. 1 and 2, the screw 1 includes; a shank 6 having an overall length 44; a pointed end portion 7 formed on an entering extremity of the shank 6; the shank 6 having a threaded shank portion 8 having thread convolutions 9 with an outer diameter 10 greater than the diameter of the first bore 3 and beginning at a first point 11 adjacent the pointed end portion 7 and extending axially along the periphery of the shank 6 to a second point 12 and adapted to form and engage threads 13 in the wood structural member 2; knurled means 14 formed in a portion of the shank 6 having a first point 15 adjacent the second point 12 of the threaded shank portion 8 and extending axially along the shank 6 to a second point 16 and having an outside diameter 17 generally equal to the outer diameter 10 of the thread convolutions 9 in the threaded shank portion 8 and having an inside diameter 18 (see FIG. 4) less than the outside diameter 17 of the knurled means 14; the shank 6 having an unthreaded shank portion 19 having a diameter 20 generally equal to the outside diameter 17 of the knurled means 14 and having a first point 21 adjacent the second point 16 of the knurled means 14 and extending axially along the shank 6 and terminating at a second point 22; the knurled means 14 being adapted for mashing over and radially outwardly without severing a substantial proportion of the wood fibers of the inner portions 23 of the threads 13 formed in the wood structural member 2 forming an annular zone 55 of mashed and severed, as well as unsevered wood fibers having an outer diameter 56 greater than the diameter 20 of the unthreaded shank portion 19 and forming a tight fit between the unthreaded shank portion 19 and the annular zone 55 of mashed and severed, as well as unsevered, wood fibers of the wood structural member 2; and a head 26 integrally connected to the shank 6 adjacent the second point 22 of the unthreaded shank portion 19.

The wood screw of the present invention need not have a threaded pointed end or a means for cutting its own bore and threads in a wood member if a bore is predrilled. It is highly advantageous, however, to form a wood screw 1 which will drill its own bore and threads in a wood member since predrilling a bore is expensive in installation time. Power drivers to drive large diameter wood screws are now widely available and thus, referring to FIGS. 1 and 4, a preferred form of the wood screw 1 of the present invention adapted to hold a wood structural member 2 to a sheet metal member 5 in shear includes; a shank 6; a pointed end portion 7 formed on an entering extremity of the shank 6 having a plurality of convolutions 27 and a recess 28 providing a cutting edge 29 adapted for forming a first bore 3 having a diameter 4; and the shank 6 having a threaded shank portion 8 having thread convolutions 9 similar to the thread convolutions 27 on the pointed end portion 7 with an outer diameter 10 greater than the diameter 4 of the first bore 3 and beginning at a first point 11 adjacent the pointed end portion 7 and extending axially along the periphery of the shank 6 to a second point 12 and adapted to form and engage threads 13 in the wood structural member 2. All other elements of the preferred form of wood screw 1 are identical to the previously described wood screw and for purposes of brevity are not repeated.

Referring to FIG. 3, knurled portion 14 may be double knurled in a cross hatched pattern or have single straight knurls formed at an angle to the axis of the screw. It has been found, however, that straight knurls 30 (see FIG. 2) having a dull edge 47 and valleys 48 between the dull edges 47 perform satisfactorily.

It has also been found that where the axial length 31 (see FIG. 1) of the knurled means 14 is substantially less than the axial length 32 of the unthreaded shank portion 19 satisfactory results are obtained.

Providing wood screw 1 with an unthreaded portion 19 reduces the power requirements to drive the screw and maximizes the amount of metal at the shear plane 41 and 41' (see FIGS. 5 and 6) adjacent the head 26 of the wood screw 1. Accordingly, the axial length 32 of the unthreaded portion 19 is preferably substantially less than the axial length 33 of the threaded portion 8.

To accommodate the power driven tool and provide maximum gripping power, the head 26 is preferably hexagonal in shape.

The head 26 is preferably formed with an integral washer 35 for several reasons. First, the upper surface 49 serves as an abutment for the nose of the power tool. Second, the under surface 50 of washer 35 provides surface area to prevent the power drill from inserting the hex head 26 through opening 45. Finally, under surface 50 frictionally engages sheet metal member 5 and the increased friction of the washer 35 against sheet metal member 5 imposes greater resistance which may cause slip clutches in the power tool to operate and stop the driving of the wood screw 1.

Operation of the wood screw of the present invention is as follows. Referring to FIG. 2, the power tool nose is inserted over hexagonal head 26 with a portion of the power tool nose in abutment with upper surface 49 of washer 35. The point 51 of wood screw 6 is then inserted through opening 45 in the sheet metal member 5 and rotation of the wood screw 6 is begun. Cutting means as formed by edge 29, recess 28, and curved surface 52 immediately begins to form first bore 3 (see FIG. 4) and to cut threads 13 into wood member 2. The cutting means on the wood screw 6 of the present invention is well known in the industry and is similar to the cutting means disclosed in Stern, U.S. Pat. No. 2,871,752.

Thread convolutions 27 on pointed end portion 7 which are part of cutting edge 29, cut threads in wood structural member 2 which enable thread convolutions 9 on threaded shank portion 8 to easily follow into the wood. As stated above, threads 13 are formed in the wood structural member having inner portions 23 extending to the outer diameter 4 of first bore 3.

Referring to FIG. 3, as the tapered entering portion 54 (see FIG. 3) of knurled portion 14 of wood screw 1 reaches outer face 53 of wood structural member 2, the dull edges 47 of each knurl 30 engage inner portions 23 of threads 13. It is preferable to taper the entering portions 54 of the knurled means 14 as shown in the drawings to lessen the shock as the knurls 30 strike the inner portions 23 of threads 13. Referring to FIG. 2, tapered entering portion 54 is bounded by lower bevel end 60 and upper bevel end 59. This is especially important since as previously stated edges 47 of the knurls 30 are dull and thus there is a greater resistance encountered by the wood screw 1 as it proceeds through the wood structural member 2.

The function of the dull edges 47 of knurls 30 is to bend the inner portions 23 of threads 13 in the structural wood member so as to mash rather than to sever a substantial portion of the wood fibers of the structural wood member. These bent over and mashed wood fibers as well as the severed wood fibers are illustrated in FIGS. 3 and 4 and are indicated generally by the number 55 which represents an annular zone of mashed and severed, as well as unsevered, wood fibers. The annular zone of mashed wood fibers 55, as seen when wood screw 1 is fully seated, is bounded by the space outboard of diameter 20 of unthreaded shank portion 19 and outer diameter 56 of the mashed fiber annular zone. Annular zone of mashed wood fibers 55 as seen in FIG. 4 extends from outer face 53 of wood structural member 2 to penetration point 61 (see FIG. 4) of upper bevel end 60 of knurled means 14 (see FIG. 2).

As the knurled means 14 proceeds into the wood structural member 2, the valleys 48 between the dull edge ridges 47 of knurls 30 fill with the unsevered fiber ends as well as severed wood fibers of the mashed over inner portions 23 of threads 13 and loose cuttings from the cutting edge 29 on the pointed end portion 7 of the wood screw 1. This filling of the valleys 48 in the knurls 30 further reduces the cutting or severing of the wood fibers as the knurl means 14 continues through the wood structural member 2.

The effects of the previously described mashing of the wood fibers is shown in FIG. 4. In this view, the wood screw 1 has been fully inserted into the structural wood member 2 and is now in place to resist shear forces acting between sheet metal member 5 and the wood structural member 2. The result of the wood mashing of inner portions 23 of threads 13 of the wood structural member 2 is that the mashed wood fibers form an annular zone 55 which tightly fills any space between the outer diameter 20 of unthreaded shank portion 19 and the outer diameter 56 of the mashed fiber annular zone 55. This annular zone 55 of tightly packed mashed wood fibers mixed with some cuttings from cutting edge 29 on the pointed end portion 7 of the wood screw 1 prevents essentially all looseness between the wood screw 1 and the structural member 2. This tight fit of the wood screw 1 with the structural wood member serves to increase the wood screws resistance to lateral displacement which contributes to the increase in shear resistance along the shear planes 41 and 41' as seen, e.g. in FIGS. 5 and 6.

By sizing the knurled means 14 with an outside diameter 17 generally equal to the outer diameter 10 of the thread convolutions 9 in the threaded shank portion 8 and generally equal to the diameter 20 of the unthreaded shank portion 19, wood splitting as the unthreaded shank portion enters the wood structural member 2 is obviated.

As an example, the wood screw 1 of the present invention may be manufactured from 1022 steel (SAE Grade 5) with a finish coat of zinc and dichromate. The hex washer head 26 may be 0.375 inch (9.5 mm). The self drilling tip or pointed end portion 7 may be a Type-17, and allows for driving without lead holes. Lead holes, however, may be required by the local building official, depending on wood type and moisture content in accordance with Section 2339.112 of the Code of International Conference of Building Officials (ICBO).

Some typical dimensions of wood screws of the present invention having an overall shank length 44 measured from the underside 50 of washer 35 to the point 51 ranging from 1½" to 3½" are as follows: The length 33 of the threaded section 8 may vary from ⅞" to 3¼" while the axial length 31 of the knurled section 14 remains at a constant 0.250". and the length 32 of the unthreaded shank portion 19 varies with the length of the wood screw 1. For example, where the shank length is 1½", the unthreaded shank portion 19 may be ⅝" whereas an overall shank length 44 of 3½" may have an unthreaded shank length 19 of 1¼". Outer diameter 10 of thread convolutions 9 may have a diameter of 0.259-0.250" and an inner diameter of 0.187" to 0.183".

While the wood screw of the present invention is shown in FIGS. 5 and 6 for use with holdown connectors used in attaching wood frame buildings to concrete foundations, the wood screw as above described may be used anywhere that wood screws of the size and type described may be used. The wood screws of the present invention may be used with heavy metal members or wood to wood connections.

Joinder of Trusses

Figure 7:
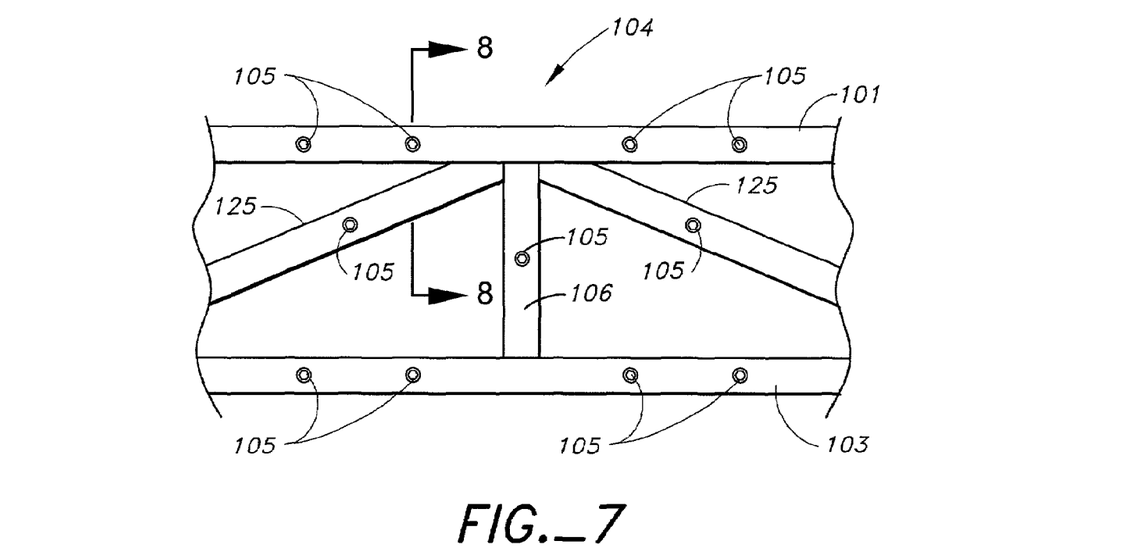
FIG. 7 is an example of a portion of a typical floor truss profile of two trusses in side by side relationship joined by screws of the present invention. The trusses are known in the trade as "Two-Ply 4×2 Floor Trusses". In such a truss, the 2×4 top and bottom chords are laid flat instead of on edge. The load is applied normal to the side of the 2×4 instead of normal to the edges of the 2×4's. The web and vertical members of the truss could be metal members, but are here shown as wood 2×4's which are laid flat instead of on edge in the same manner as the top and bottom chords.

Use of wood trusses or metal trusses having at least one wood chord are common in the construction industry. It is becoming increasingly common for conditions to arise due to loading and other considerations to join two or more trusses side-by-side so that the loading is distributed to the additional truss or trusses. This application is directed to those trusses in which the wood members of the respective chords which are to be joined are in edge-to-edge relationship. An example of such a truss is illustrated in FIG. 7 and is known as a floor truss in which the top and bottom chords 101 and 102 are parallel. This application is not limited to floor trusses, or trusses in which the bottom and top chords are parallel. This application fully applies to trusses, regardless of their type. This application, is however, directed to trusses in which the adjoining truss members to be joined are oriented in an edge to edge relationship. In other words, the wood members are laid flat instead of on edge. Thus the load is applied normal to the side of the wood member such as a 2×4 instead of normal to the edge. This edge to edge relationship is shown in FIGS. 7-13.

The prior art system for joining side by side trusses in which the wood members to be joined are edge-to-edge is to use a metal bracket joined to each adjoining wood member. The truss bracket disclosed in U.S. Pat. No. 5,653,079 assigned to United Steel Products Company is one such bracket. Another system is the use of metal angles by Simpson Strong-Tie Company Inc. as illustrated in their catalog at page 95 under the heading L70 Reinforcing Angle. As stated in the catalog; "L70 reinforcing angles may be used in pairs to transfer loads between floor truss plys. As set forth in the Simpson catalog, even under the best conditions, the load transfer rate equals 40% of the applied load when the applied load is within ⅔ of the span.

The United Steel Products Company U.S. Pat. No. 5,653,079 does not disclose what percentage of load transfer is attained between adjoining trusses, but Applicant's test show that none of the connector clips used by Simpson's competitors, including United Steel Products Company, would transfer 50% of the applied load to the second truss. It is applicant's belief that this low percentage is due to the looseness of the bracket connection. The bracket joint between the loaded truss and the auxiliary truss could not be made stiff enough to take the spring factor out of the joint. The sloppiness of each joint prevented the trusses from really ever acting as a unit. Since there was too much movement between the side-by-side trusses, they could not get good load transfer.

Since the excess movement between adjacent trusses was observable, and since excess bending is a well known cause of splitting when boards are laid flat, the idea of joining boards with screws did not occur to anyone as a feasible solution. In fact, driving screws through the edges of 2×4 wood members at regular intervals would intuitively lead to a greater tendency to split the wood chords. "Outside the box" thinking was clearly called for to find a solution which would substantially improve the abysmal 50% ceiling to load transfer between the loaded beam and an auxiliary beam. Applicant, although he knew of all the aforesaid problems, thought he would try joining edge to edge two by fours with the SDS ¼×6 screws described in U.S. Pat. No. 6,109,850. The crude experiment worked amazingly well. Even though the two joined 2×4's still bent and ultimately split, applicant knew that a single truss provided a stiffer platform. The test would be whether screws would provide a stiffer joint between two trusses than the existing brackets. Applicant tried an experiment on short trusses with SDS ¼×6 screws and it was successful. The experiment, even though crude, yielded a greater than 50% transfer of load from the side-by-side auxiliary truss. This was a greater transfer than others had been obtaining, and this led to full size multiple trusses which confirmed that the load transfer was significantly better than the metal bracket connector approach.

Floor trusses have been successfully tested installing screws as follows:
  A. SDS ¼×6 screws in the truss top chord only.
  B. SDS ¼×6 screws in the top and bottom chords.
  C. SDS ¼×6 screws in a vertical web of the truss.
  D. SDS ¼×6 screws in diagonal and vertical webs of the truss.
  E. SDS ¼×6 screws at truss mid-panel points.

In addition to increasing he load transfer to auxiliary trusses, the use of screws instead of bracket connectors has the following advantages:
  A. Screws can be installed before or after the trusses are "in place". (Most competitor products must be installed before the trusses are "in place".
  B. Installation can be performed using standard construction equipment.
  C. The differential deflection performance is improved.
  D. There are several installation configurations that can be used. (i.e. install SDS ¼×6 screws in top chord only, in bottom chord webs only, in diagonal webs only, and in vertical webs only.

Referring to FIG. 7, a preferred form of the invention is illustrated in which a pair of floor trusses 104 is illustrated having top and bottom parallel wood chords 101 and 103 in which the wood chords are laid flat and the edges of the wood members including chords 101 and 102, vertical member 106 and diagonal members 125 and 125' are joined by fasteners 105.

Figure 8:
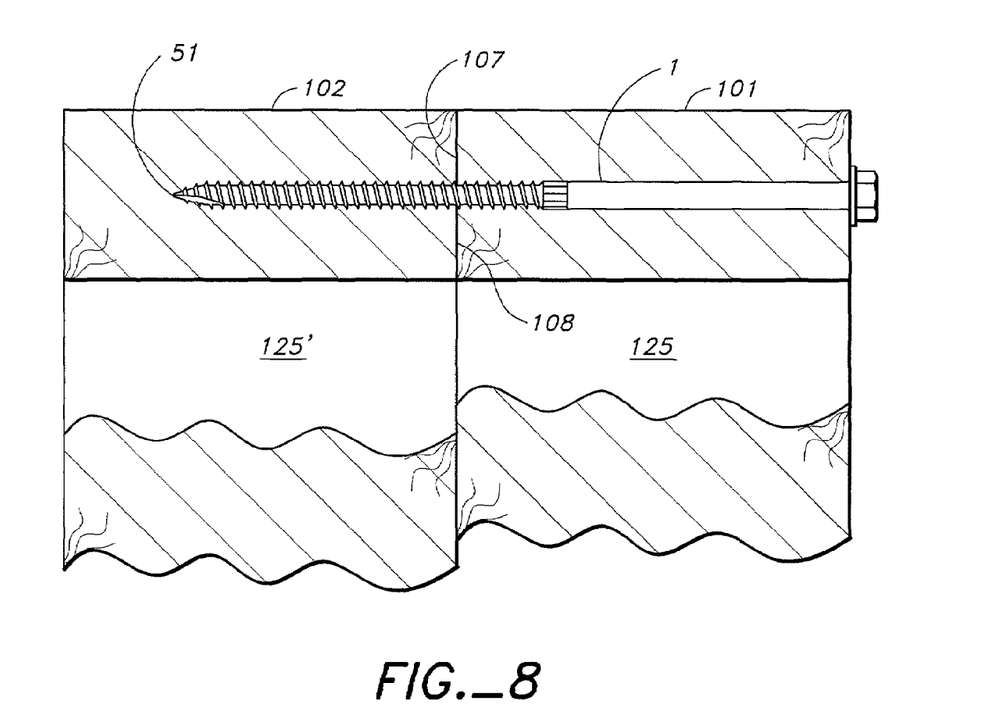
FIG. 8 is a cross section of an enlarged portion of the truss chords and web members of the two side-by-side trusses illustrated in FIG. 7 taken along line 8-8 of FIG. 7 illustrating a typical installation of screws of the present invention having a self boring cutting point and a dull knurled portion.

Referring to FIG. 8, wood screw 1 of the present invention is illustrated joining chords 101 and 102 with edge 107 of chord 101 abutting edge 108 of chord 102. Note that point 51 of wood screw 1 penetrates a substantial distance into wood chord 102, but does not necessarily extend all the way through.

Figure 9:
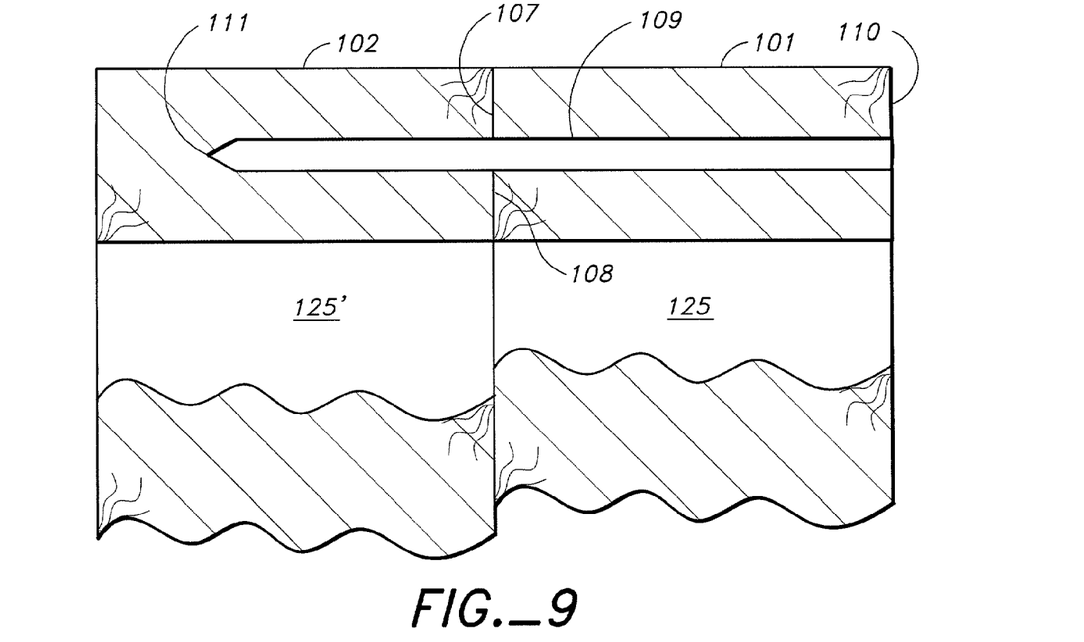
Figure 10:
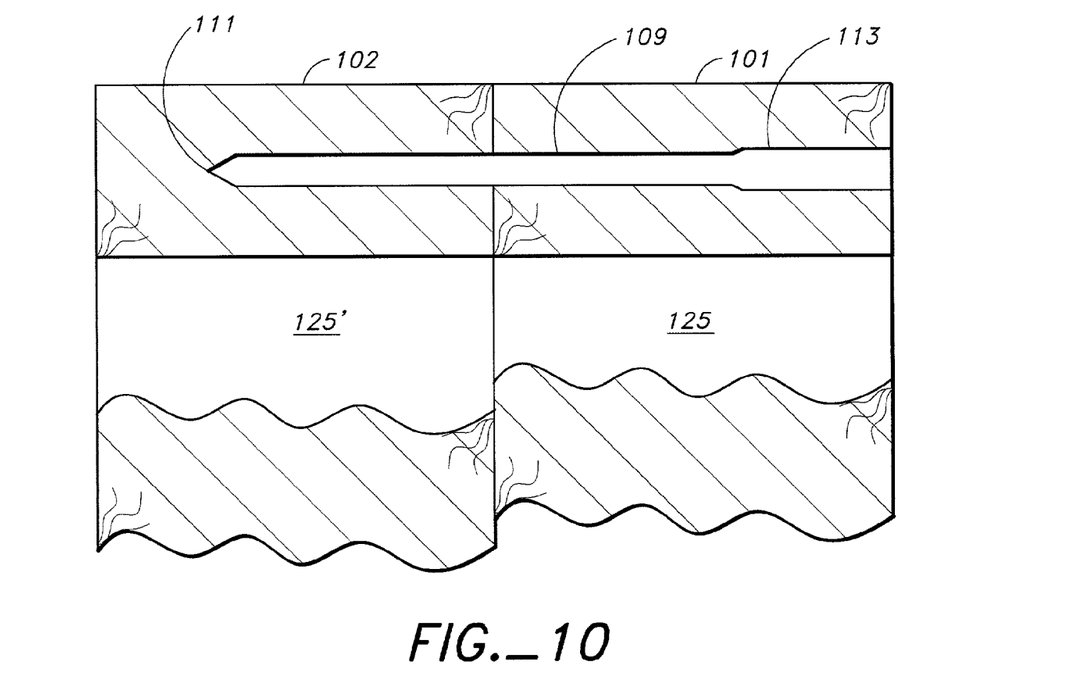
Figure 11:
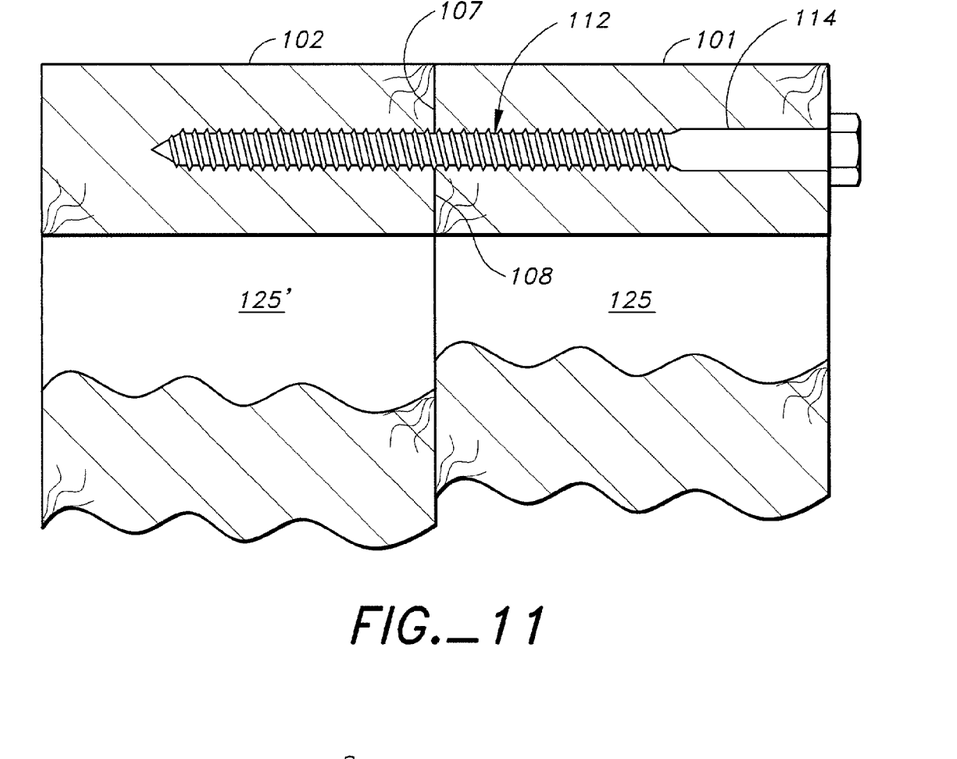

FIGS. 9, 10 and 11 illustrate another form of the invention. FIG. 9 illustrates a first bore 109 drilled through chords 101 and 102 from first edge 110 to second edge 107 of chord 101, and through edge 108 of chord 102 to a point 111 substantially through chord 102.

To attain the necessary tightness of fit for a lag screw 112 as illustrated in FIG. 11, a second bore hole 113 is bored having generally the length of the unthreaded portion 114 of the lag screw 112. FIG. 11 shows lag screw 112 properly installed within chords 101 and 102.

The two lead holes of different diameters recommended for installation of a lag screw in the present application and in most lag screw installations is adopted from the wood design reference book, *Design of Wood Structures, Fourth Edition* by Breyer, Fridley and Cobeen and page 13.45 is provided in the Information Disclosure Statement.

Also, the following statement is taken from the 1997 NDS (the governing wood design code used in all major U.S. building codes):

9.1.2 Fabrication and Assembly
  9.1.2.1 Lead holes for lag screws shall be bored as follows:
    (a) The clearance hole for the shank shall have the same diameter as the shank, and the same depth of penetration as the length of the unthreaded shank.
    (b) The lead hole for the threaded portion shall have a diameter equal to 65% to 85% of the shank diameter in wood with G>0.6, 60% to 75% in wood with 0.5<G[0.6, and 40% to 70% in wood with G[0.5(see Table 9A) and a length equal to at least the length of the threaded portion. The larger percentile in each range shall apply to lag screws of greater diameters.
  9.1.2.2 Lead holes or clearance holes shall not be required for ⅜" and smaller diameter lag screws loaded primarily I withdrawal in wood with G[0.5 (see Table 9A), provided that edge distances, end distances and spacing are sufficient to prevent unusual splitting.
  9.1.2.3 The threaded portion of the lag screw shall be inserted in its lead hole by turning with a wrench, not by driving with a hammer.
  9.1.2.4 Soap or other lubricant shall be used on the lag screws or in the lead holes to facilitate insertion and prevent damage to the lag screw.

The "G" referred to above is the specific gravity (a measure of density). The Table 9A provides these values. The values for Southern Pine, Douglas Fir-Larch and Spruce-Pine-Fir are, respectively, 0.55, 0.49 and 0.36.

Figure 12:
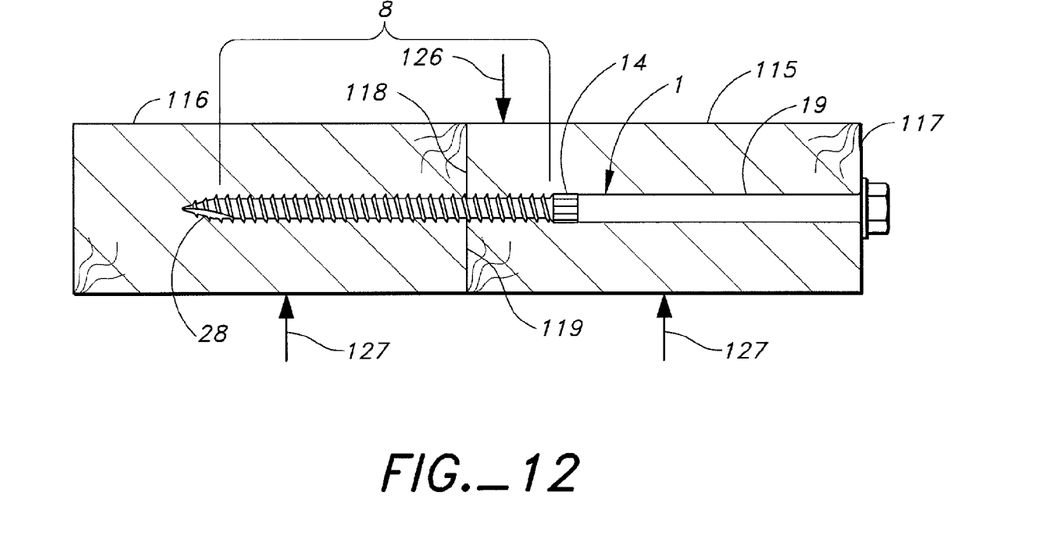
FIG. 12 illustrates a screw of the present invention joining two wood members in an edge to edge configuration.
Figure 13:
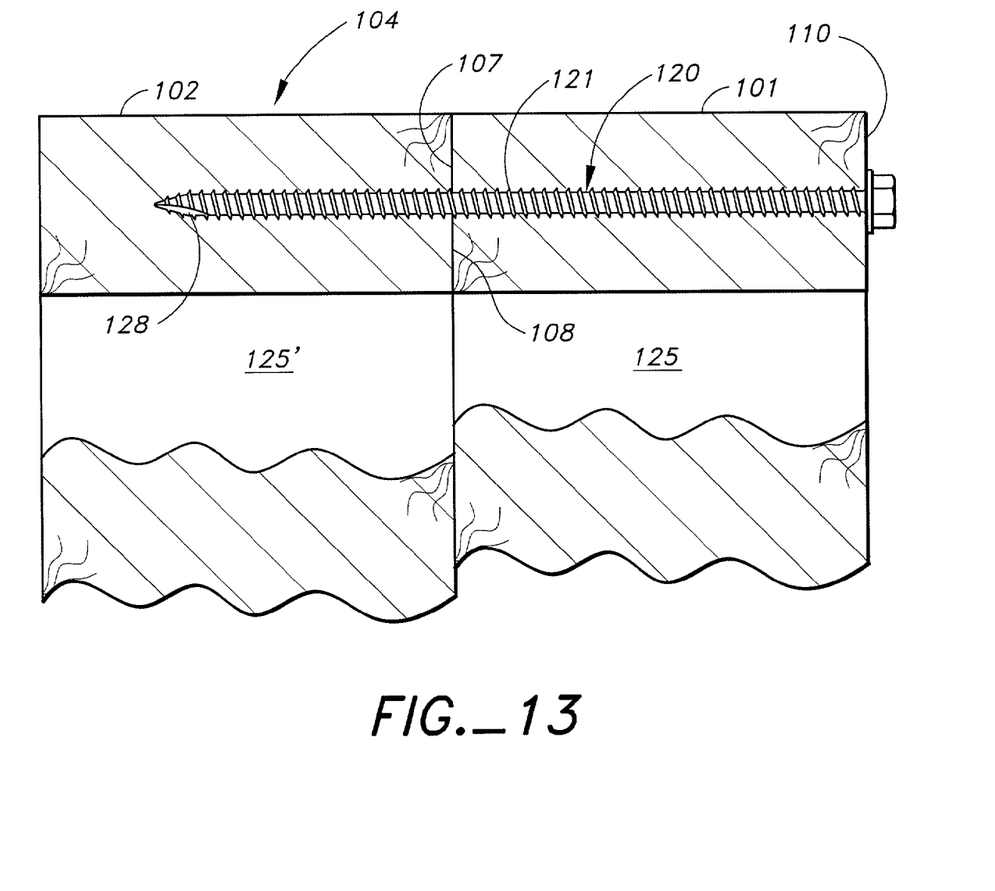
FIG. 13 illustrates another form of the invention in which a standard wood screw is used to join multiple side by side trusses having wood members in an edge to edge configuration

FIG. 12 shows still another form of the present invention. In this form, a screw 1 of the present invention having a recess 28 for self drilling a bore hole, a threaded shank portion 8, a dull knurl portion 14, and unthreaded shank portion 19 is inserted through boards 115 and 116 from edge 117 of board 115 to distal edge 118 and from edge 119 to a substantial portion within board 116. Since a large enough force 126 applied to boards 115 and 116 would ultimately split one or both boards 115 and 116 at about the level of screw 1 as the boards bent further and further due to load 126, a restraining force to limit bending or some other means illustrated by arrows 127 must be used. Such bending restraints could be springs or limiters which stopped all bending beyond a certain point or some device to limit the force 126 from acting on the boards so that a certain predetermined bending deformation could not be exceeded. Still another form of the invention is illustrated in FIG. 13 in which a standard wood screw 120 having threads 21 throughout a substantial portion of the length of its shank is inserted or driven into the edge 110 of chord 101, through the distal edge 107 of chord 101 and into the edge 108 and through a substantial portion of chord 102 of a truss 104. The wood screw 120 may be either self drilling with a drill point recess 128 or have no drill point, but instead be driven into a predrilled bore.

The screw illustrated in FIG. 13, has only limited use, but nevertheless may be used in some truss applications. The screw 1 illustrated in FIGS. 1-6 is far superior in its ability to prevent splitting of the wood in an edge driven application and in ease and speed of installation.

We claim:
1. In a multi-ply wood structure shear connection including a plurality of wood screw fasteners and a plurality of wood structural members placed in edge-to-edge configuration comprising; said screw fastener including, a. a shank having a head end;
b. a pointed end portion formed on an entering extremity of said shank, opposite said head end, having a plurality of thread convolutions and a recess providing a cutting edge for forming a first bore in said wood structural members and having a selected outer diameter;
c. said shank having a threaded shank portion having thread convolutions similar to said thread convolutions on said pointed end portion with an outer diameter greater than said diameter of said first bore and beginning at a first point adjacent said pointed end portion and extending axially along the periphery of said shank to a second end point and adapted to form and engage threads in said wood structural members;
d. said shank having a knurled portion formed with a plurality of knurls having dull edges and having a first point adjacent said second point of said threaded shank portion and extending axially along said shank to a second point and having an outside diameter generally equal to the outer diameter of said thread convolutions in said threaded shank portion and having an inside diameter substantially less than said outside diameter of said knurled portion and equal to or only slightly greater than the diameter of said first bore;
e. said knurls are formed with a tapered entering portion forming a smooth transition between the inner diameter of said shank and said outside diameter of said knurled portion;
f. said shank having an unthreaded shank portion having a diameter generally equal to said outside diameter of said knurled portion and having a first point adjacent said second point of said knurled portion and extending axially along said shank a distance substantially greater than the length of said knurled portion and the thickness of said metal connector at said planar portion and terminating at a second point adjacent said head end;
g. said knurls having said dull edges bend over, buckle and crush without severing, a substantial proportion of the wood fibers of the inner portions of said threads formed in said wood structural members forming a nominal annular zone of bent over, buckled and crushed, wood fibers having an outer diameter nominally greater than said diameter of said unthreaded shank portion and forming a tight fit between said unthreaded shank portion and said nominal annular zone of bent over, buckled and crushed wood fibers of said wood structural member;
h. a head integrally connected to said shank at said head end; and
i. each of said wood screw fasteners being driven through an edge face of each of said wood structural members and through at least a substantial portion of each of said wood structural members and said unthreaded shank portion extending a substantial distance within at least one of said wood structural members.

2. In a multi-ply wood structure shear connection as described in claim 1 comprising:
a. said wood structural members are configured in a truss.

3. In a multi-ply wood structure shear connection as described in claim 2 comprising:
a. said truss is a floor truss having parallel top and bottom chords.

4. In a multi-ply wood structure shear connection as described in claim 3 comprising:
a. said screw fasteners join only said top chords.

5. In a multi-ply wood structure shear connection as described in claim 3 wherein:
a. said screw fasteners join only said bottom chords.

6. In a multi-ply wood structure shear connection as described in claim 3 wherein:
a. said floor truss includes vertical members; and
b. said screw fasteners join only said vertical members.

7. In a multi-ply wood structure shear connection as described in claim 3 comprising:
a. said floor truss includes diagonal members; and
b. said screw fasteners join only said diagonal members.

8. In a multi-ply wood structure shear connection as described in claim 3 comprising:
a. said floor truss includes diagonal and vertical members; and
b. said screw fasteners join said top chords, said bottom chords, said vertical members and said diagonal members.

9. In a multi-ply wood structure shear connection including a plurality of wood screw fasteners and a plurality of wood structural members formed with a first bore comprising and placed in edge-to-edge configuration comprising; said wood screw fastener including:
a. a shank having a head end;
b. a pointed end portion formed on an entering extremity of said shank opposite said head end for insertion through said first bore in said wood structural members;
c. said shank having a threaded shank portion having thread convolutions with an outer diameter greater than the diameter of said first bore and beginning at a first point adjacent said pointed end portion and extending axially along the periphery of said shank to a second point and adapted to form and engage threads in said wood structural member;
d. said shank having a knurled portion formed with a plurality of knurls having dull edges and having a first point adjacent said second point of said threaded shank portion and extending axially along said shank to a second point and having an outside diameter generally equal to the outer diameter of said thread convolutions in said threaded shank portion and having an inside diameter substantially less than said outside diameter of said knurled portion and equal to or only slightly greater than the diameter of said first bore;
e. said knurls are formed with a tapered entering portion forming a smooth transition between the inner diameter of said shank and said outside diameter of said knurled portion;
f. said shank having an unthreaded shank portion having a diameter generally equal to said outside diameter of said knurled portion and having a first point adjacent said second point of said knurled portion and extending axially along said shank a distance substantially greater than the length of said knurled portion and the thickness of said metal connector at said planar portion and terminating at a second point adjacent said head end;
g. said knurls having said dull edges bend over buckle and crush without severing, a substantial proportion of the wood fibers of the inner portions of said threads formed in said wood structural member forming a nominal annular zone of bent over buckled and crushed wood fibers, having an outer diameter nominally greater than said diameter of said unthreaded shank portion and forming a tight fit between said unthreaded shank portion and said nominal annular zone of bent over buckled and crushed wood fibers, of said wood structural members;
h. a head integrally connected to said shank at said head end; and i. each of said wood screw fasteners being driven through an edge face of each of said wood structural members and through at least a substantial portion of each of said wood structural members and said unthreaded shank portion extending a substantial distance within at least one of said wood structural members.

10. In a multi-ply wood structure shear connection as described in claim 9 comprising:
   a. said wood structural members are configured in a truss.

11. In a multi-ply wood structure shear connection as described in claim 10 comprising:
   a. said truss is a floor truss having parallel top and bottom chords.

12. In a multi-ply wood structure shear connection as described in claim 11 comprising:
   a. said screw fasteners join only said top chords.

13. In a multi-ply wood structure shear connection as described in claim 11 wherein:
   a. said screw fasteners join only said bottom chords.

14. In a multi-ply wood structure shear connection as described in claim 11 wherein:
   a. said floor truss includes vertical members; and
   b. said screw fasteners join only said vertical members.

15. In a multi-ply wood structure shear connection as described in claim 11 wherein:
   a. said floor truss includes diagonal members; and
   b. said screw fasteners join only said diagonal members.

16. In a multi-ply wood structure shear connection as described in claim 11 comprising:
   a. said floor truss includes diagonal and vertical members; and
   b. said screw fasteners join said top chords, said bottom chords, said vertical members and said diagonal members.

17. In a multi-ply wood structure shear connection including a plurality of wood screw fasteners and a plurality of wood structural members placed in edge-to-edge configuration, said connection comprising:
   a. said screw fasteners formed with a threaded portion at their distal ends and a nonthreaded portion at their proximal ends, said nonthreaded portion having a diameter greater than the minor diameter of the threaded portion, said screw fasteners being inserted into and through a proximal one of said plurality of wood structural members, and said screw fasteners being inserted into a distal one of said plurality of wood structural members, each of said wood structural members being formed with two opposed and substantially parallel edges and two opposed and substantially parallel sides, said opposed and substantially parallel edges being comparatively narrower than the opposed and substantially parallel sides, wherein one of each pair of opposed edges of each structural member abuts another edge of said pair of opposed edges of a different one of said plurality of structural members;
   b. said wood structural members are formed with a first prebore opening for receipt of said screw fastener therethrough, said first prebore having a diameter smaller than the minor diameter of said threaded portion and said first prebore is positioned so as to extend from edge to edge in said proximal wood structural members and into the edge of the distal structural member, and generally parallel to the sides of said distal structural member and substantially therethrough;
   c. at least one of said structural members is formed with a second prebore opening coaxial to and coincident to a portion of said first prebore opening and having a diameter generally equal to said diameter of said nonthreaded portions of said wood screw fasteners and a length generally equal to said nonthreaded portions of said wood screw fasteners for close fitting engagement with said nonthreaded portions; and
   d. means supporting at least one side of said wood structural members to limit deflection thereof to prevent splitting of said wood structural members under selected design loading.

18. In a multi-ply wood structure shear connection as described in claim 17 comprising:
   a. said wood structural members are configured in a truss.

19. In a multi-ply wood structure shear connection as described in claim 18 comprising:
   a. said truss is a floor truss having parallel top and bottom chords.

20. In a multi-ply wood structure shear connection as described in claim 19 comprising:
   a. said screw fasteners join only said top chords.

21. In a multi-ply wood structure shear connection as described in claim 19 wherein:
   a. said screw fasteners join only said bottom chords.

22. In a multi-ply wood structure shear connection as described in claim 19 wherein:
   a. said floor truss includes vertical members; and
   b. said screw fasteners join only said vertical members.

23. In a multi-ply wood structure shear connection as described in claim 19 wherein:
   a. said floor truss includes diagonal members; and
   b. said screw fasteners join only said diagonal members.

24. In a multi-ply wood structure shear connection as described in claim 19 comprising:
   a. said floor truss includes diagonal and vertical members; and
   b. said screw fasteners join said top chords, said bottom chords, said vertical members and said diagonal members.

25. A multi-ply wood structure shear connection including:
   a. a plurality of self-drilling wood screw fasteners;
   b. a plurality of wood structural members, wherein each wood structural member is part of a truss having top and bottom chords, and wherein each of said self-drilling wood screw fasteners is inserted into and through a proximal one of said plurality of wood structural members without any form of pre-drilling, and each of said self-drilling wood screw fasteners is inserted into a distal one of said plurality of wood structural members without any form of pre-drilling, and wherein each of said wood structural members has at least one relatively narrow edge face and one relatively wide side face, wherein:
      i. said self-drilling wood screw fasteners include:
         (a). a shank having a head end;
         (b). an entering extremity of said shank opposite said head end; and
         (c). a head integrally connected to said shank at said head end, wherein:
            (1) said wood structural members have a plurality of first bores, wherein said plurality of first bores are formed only by driving said plurality of screw fasteners into said wood structural members; and
            (2) said shank of each of said self-drilling wood screws has a threaded shank portion having thread convolutions with an outer diameter greater than the diameter of said first bores, said threaded shank portion beginning at a first point adjacent said pointed end portion and extending axially along the periphery of said shank to a second point and adapted to form and engage threads in said wood structural members; and ii. each of said self-drilling wood screw fasteners is driven through at least a substantial portion of each of said wood structural members; and wherein c. each of said wood structural members is formed with two opposed and substantially parallel edge faces and two opposed and substantially parallel side faces, said opposed and substantially parallel edge faces being comparatively narrower than the opposed and substantially parallel side faces, wherein one of each pair of opposed edge faces of each structural member abuts another edge face of said pair of opposed edge faces of a different one of said plurality of structural members such that said edge faces are placed in edge-face-to-edge-face configuration and said side faces being placed in side-by-side configuration; and each of said self-drilling wood screw fasteners is driven through an edge face of one of said wood structural members and said screw fasteners are positioned so as to extend from edge face to edge face in said proximal wood structural members and into the edge face of the distal structural member, and generally parallel to the side faces of said distal structural member.

26. A multi-ply wood structure shear connection as described in claim 25, wherein:
   a. a pointed end portion is formed on said entering extremity of said shank.

27. A multi-ply wood structure shear connection as described in claim 26, wherein:
   a. said pointed end portions of said self-drilling wood screw fasteners has a recess providing a cutting edge for forming a first bore in said wood structural members and having a selected outer diameter.

28. A multi-ply wood structure shear connection as described in claim 25, wherein:
   a. said wood structural members are formed with a first bore; and
   b. said pointed end portion is formed for insertion through said first bore.

29. A multi-ply wood structure shear connection as described in claim 25, wherein:
   a. trusses are floor trusses having parallel top and bottom chords.

30. A multi-ply wood structure shear connection as described in claim 29, wherein:
   a. said screw fasteners join only said top chords.

31. A multi-ply wood structure shear connection as described in claim 29, wherein:
   a. said screw fasteners join only said bottom chords.

32. A multi-ply wood structure shear connection as described in claim 29, wherein:
   a. said floor trusses include vertical members; and
   b. said screw fasteners join only said vertical members.

33. A multi-ply wood structure shear connection as described in claim 29, wherein:
   a. said floor trusses include diagonal members; and
   b. said screw fasteners join only said diagonal members.

34. A multi-ply wood structure shear connection as described in claim 29, wherein:
   a. said floor trusses include diagonal and vertical members; and
   b. said screw fasteners join said top chords, said bottom chords, said vertical members and said diagonal members.

* * * * *